Figure 1:
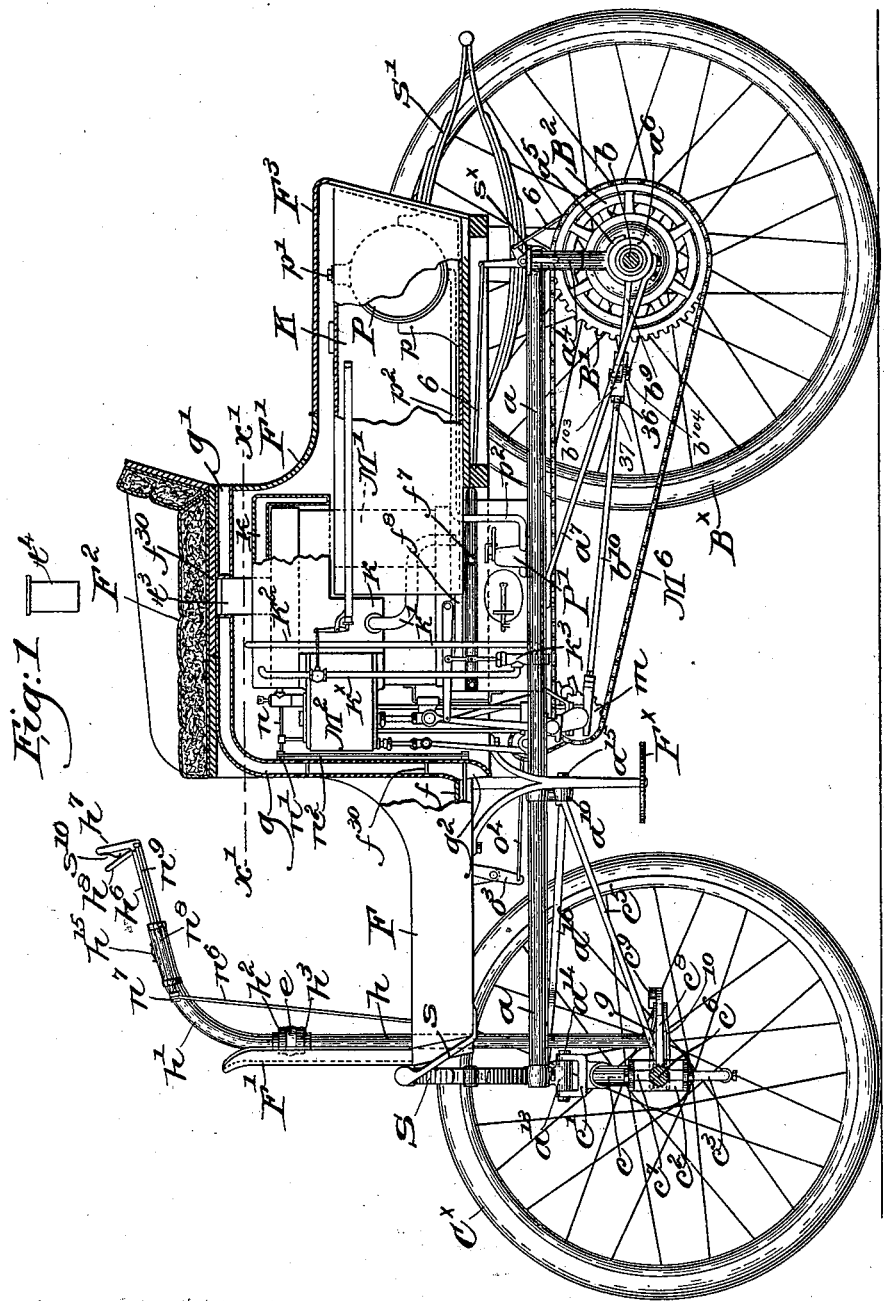

No. 652,941. Patented July 3, 1900.
G. E. WHITNEY.
MOTOR VEHICLE.
(Application filed Apr. 30, 1897.)
(No Model.) 5 Sheets—Sheet 1.

Witnesses.
Edward F. Allen.
Thomas J. Drummond

Inventor:
George E. Whitney,
by Crosby & Gregory
attys.

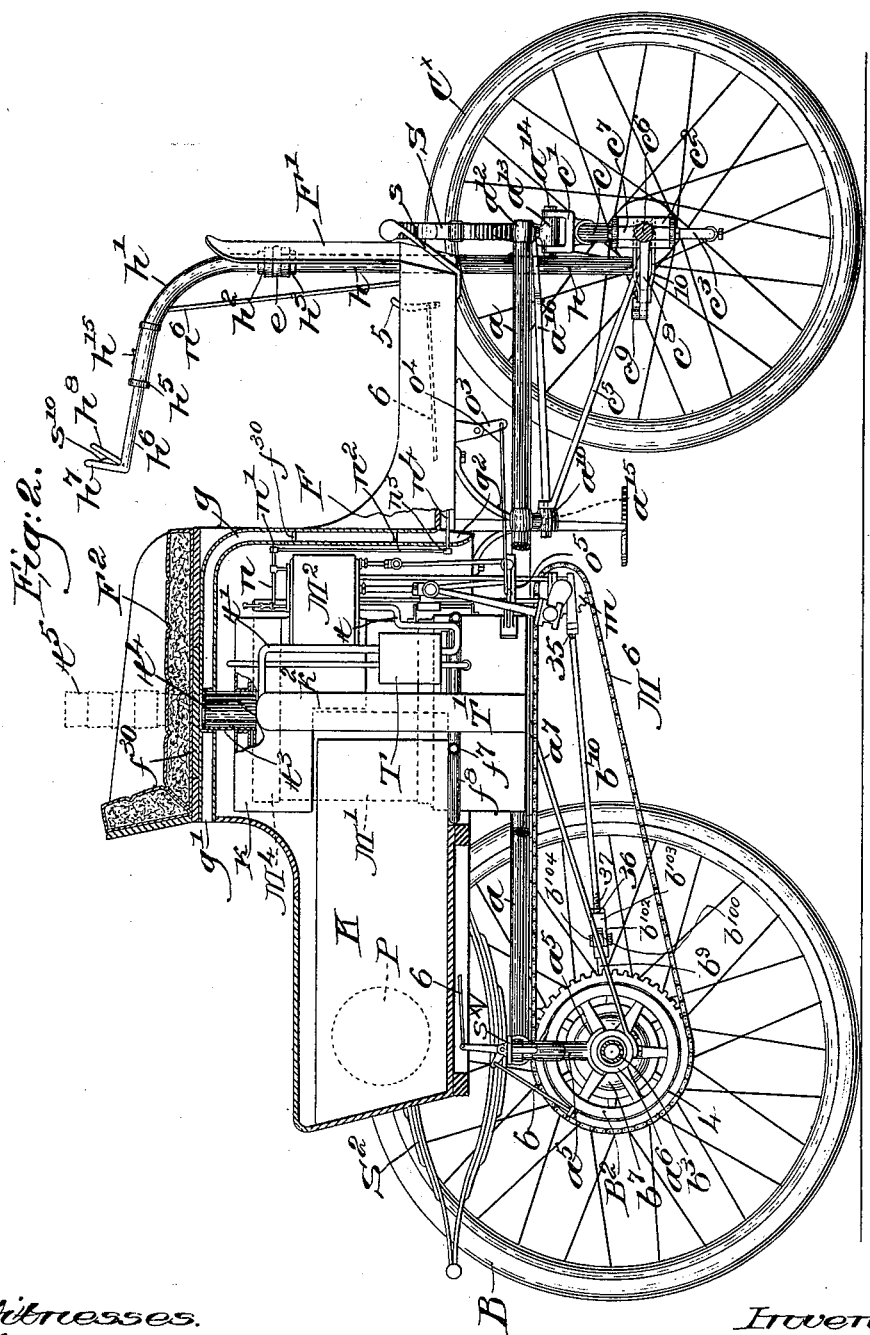

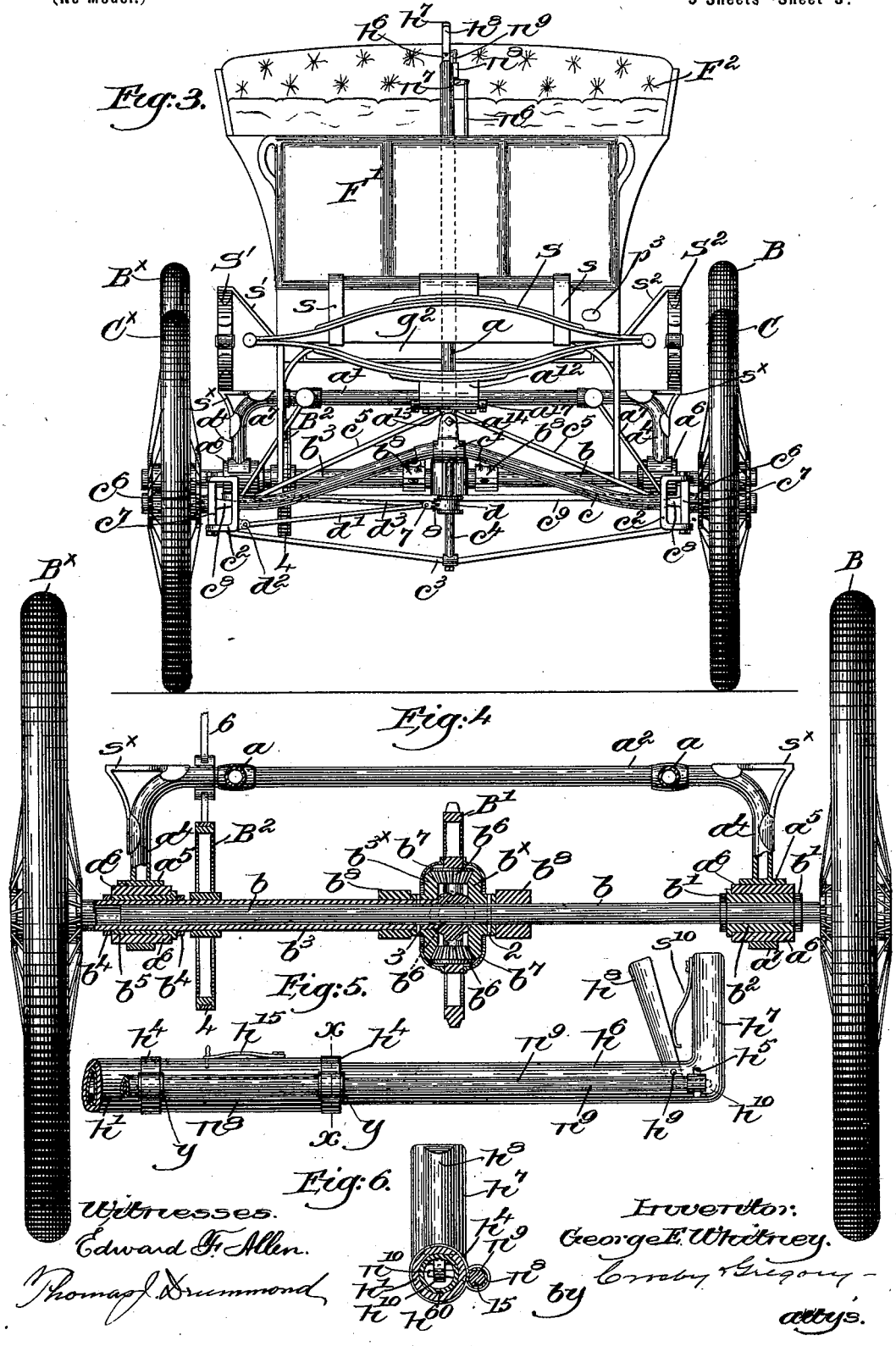

No. 652,941. Patented July 3, 1900.
G. E. WHITNEY.
MOTOR VEHICLE.
(Application filed Apr. 30, 1897.)
(No Model.) 5 Sheets—Sheet 4.
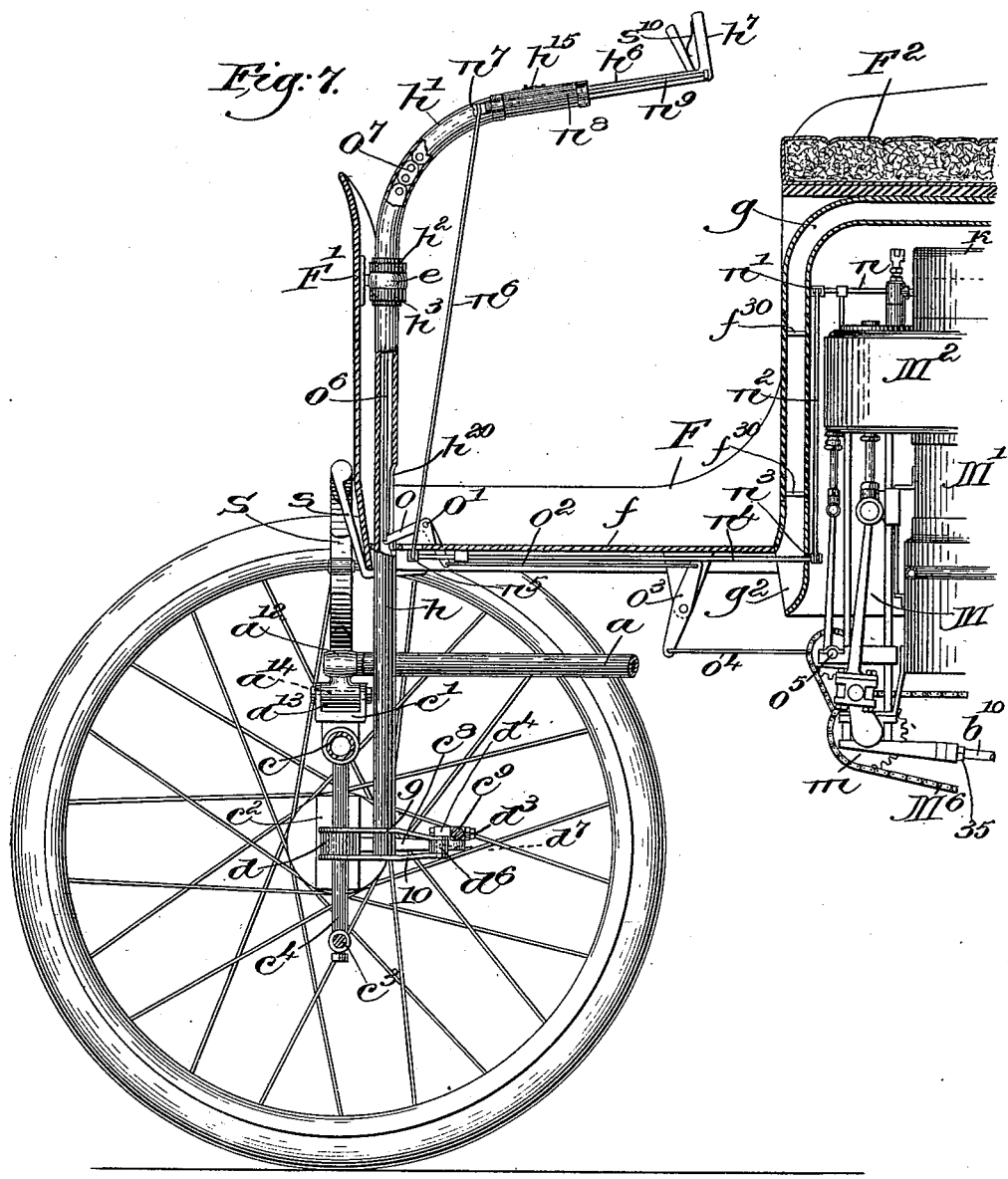
Fig. 7.
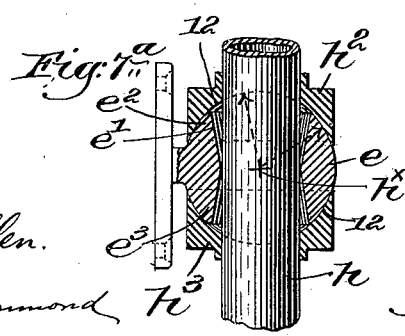
Fig. 7ª.
Witnesses.
Edward F. Allen.
Thomas J. Drummond.
Inventor:
George E. Whitney
By Crosby & Gregory
attys.

No. 652,941. Patented July 3, 1900.
G. E. WHITNEY.
MOTOR VEHICLE.
(Application filed Apr. 30, 1897.)
(No Model.) 5 Sheets—Sheet 5.
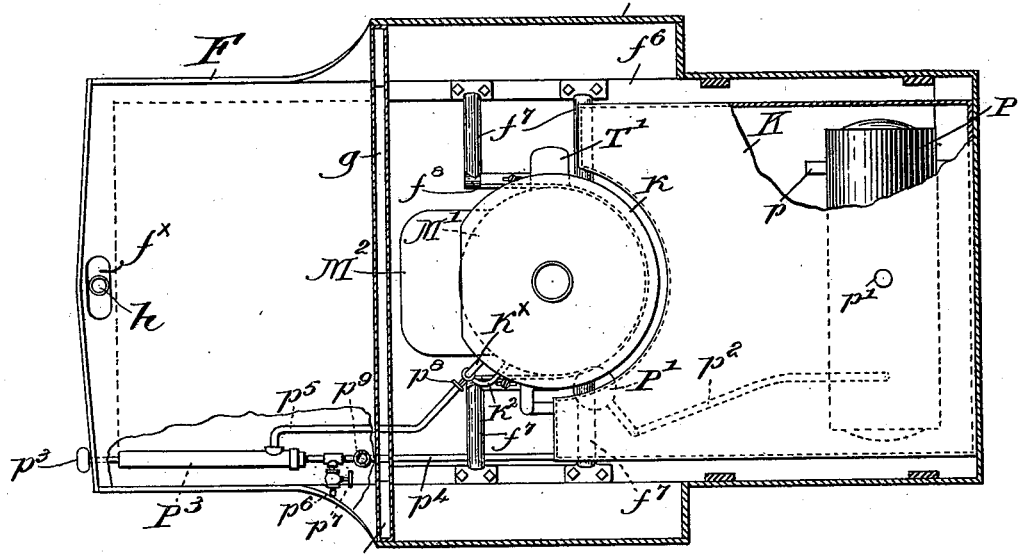
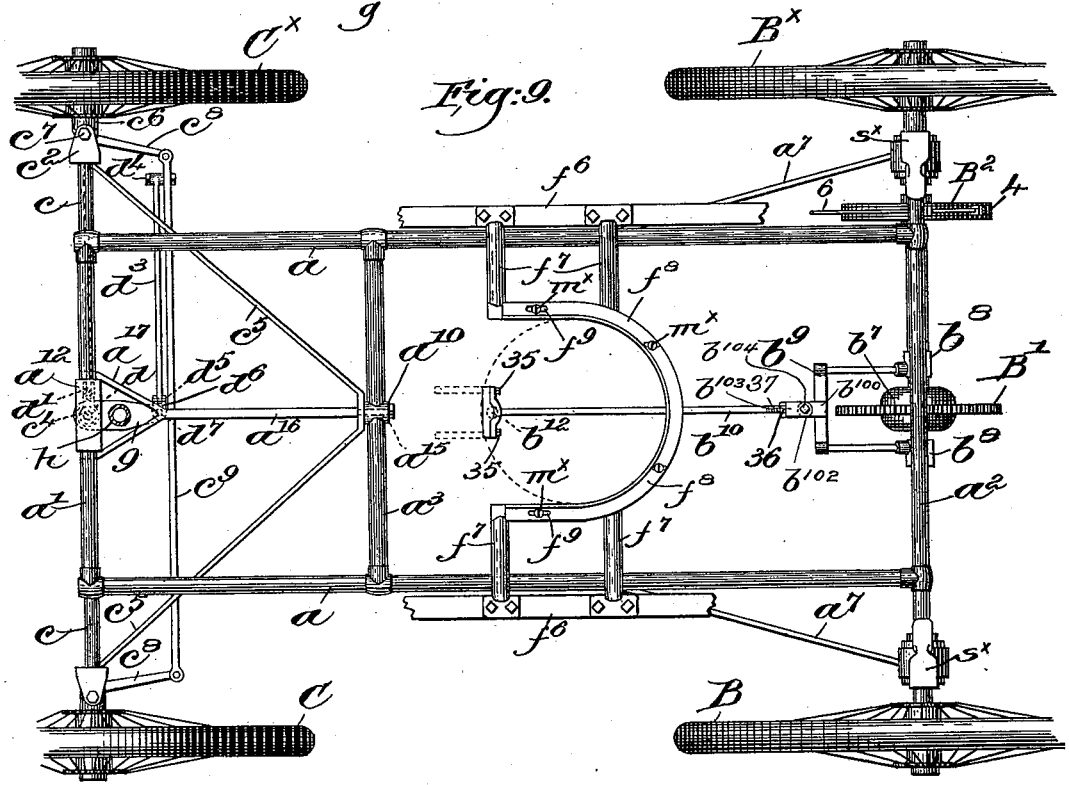

UNITED STATES PATENT OFFICE.

GEORGE E. WHITNEY, OF BOSTON, MASSACHUSETTS, ASSIGNOR TO THE WHITNEY MOTOR WAGON COMPANY, OF SAME PLACE.

MOTOR-VEHICLE.

SPECIFICATION forming part of Letters Patent No. 652,941, dated July 3, 1900.

Application filed April 30, 1897. Serial No. 634,514. (No model.)

*To all whom it may concern:*

Be it known that I, GEORGE E. WHITNEY, of Boston, in the county of Suffolk and State of Massachusetts, have invented an Improvement in Motor-Vehicles, of which the following description, in connection with the accompanying drawings, is a specification, like letters and figures on the drawings representing like parts.

This invention relates to motor or horseless vehicles, wherein the motive power is carried by the vehicle itself, and while the mechanism herein described is applicable to a vehicle propelled by any kind of mechanical motive power my invention is especially useful when steam or other expansible medium is employed as the motive power.

The aim of my invention is, among other features, to provide great flexibility, compactness, lightness, and perfect controllability, with simplicity and ease of operation.

The engine and boiler herein shown are not described in detail, as they form the subject-matter of United States Patent No. 601,218, granted March 22, 1898, and are therein claimed, and accordingly only enough of such apparatus will be hereinafter described as may be necessary to clearly show the relation of the motive-power devices to the vehicle and controlling means.

The various features of my invention will be fully set forth in the specification and pointed out in the claims.

Figure 1, in side elevation, represents a motor-vehicle embodying my invention, the near wheels being omitted and a portion of the body being broken out, and also in section to more clearly show the construction. Fig. 2 is a similar view of the opposite side of the vehicle, the body and a part of the frame being broken out. Fig. 3 is a front end elevation of the vehicle. Fig. 4 is an enlarged front elevation of the drop-frame for the rear or propelling wheels, the shaft or axle bearings, compensating device, and some other parts being shown in section. Fig. 5 is an enlarged side elevation of a part of the controlling means for regulating the speed, direction, and steering of the vehicle. Fig. 6 is a transverse sectional view thereof on the line $xx$, Fig. 5, looking toward the right hand. Fig. 7 is an enlarged side elevation and sectional view of the fore part of the vehicle to more clearly show the operation of the controlling means. Fig. $7^a$ is a sectional view of the bearing for the steering-head, to be described. Fig. 8 is a top or plan view of the body, partly broken out, and taken below the line $x'x'$, Fig. 1; and Fig. 9 is a top or plan view of the frame, showing more clearly the support for the boiler and engine, which support is secured to the body.

The frame of the vehicle, as best shown in Fig. 9, comprises side bars $a$ and front and rear cross-bars $a'$ $a^2$, respectively, and with an intermediate cross-bar $a^3$ near the forward end of the frame, the bars being preferably tubular, to secure combined lightness, strength, and resiliency, and securely held together by suitable joints. The rear cross-bar $a^2$, as shown in Fig. 4, is dropped at its ends $a^4$ to form seats $a^5$ for sleeve-like bearings $a^6$, in which the rear or driven axle is mounted. It will be obvious that this axle or shaft, which is the driven member, is thus fixedly positioned on the frame, the frame, wheels, and connecting means therefor constituting what is commonly termed the "running-gear."

The driven axle is compound, comprising a shaft $b$, to which one of the rear driving or propelling wheels B is rigidly secured, said shaft having collars $b'$ thereon to retain in place a bushing $b^2$, flanged at its inner end to rest against the inner end of the sleeve-bearing $a^6$ and take up end thrust. The shaft $b$ extends across the longitudinal center of the frame and terminates, preferably, at a point well within or beyond the left-hand bearing $a^6$, Fig. 4, the other propelling-wheel B$^\times$ being rigidly secured to the outer end of a long sleeve $b^3$, embracing the shaft $b$ and extended through the left-hand bearing, preferably to the center of the axle, said sleeve having collars $b^4$ fast thereon at opposite ends of a bushing $b^5$, inserted in the adjacent bearing $a^6$. The long engagement of the shaft $b$ and sleeve $b^3$ provides a strong and rigid compound driven shaft or axle, one part of which is rotative relative to the other in order to enable the wheels B B$^\times$ to travel at different rates of speed when turning corners or moving on curves. The strength of the axle is further increased by the fact that the shaft $b$ extends entirely across the frame from one to and well within or through the other bearing, so that both bearings receive their proper share of strains. Bevel-gears $b^{\times}$ and $b^{3\times}$ are rigidly secured, as by pins 2 3, to the shaft $b$ and sleeve $b^3$, respectively, at a point near the center of the axle, said gears meshing with a series of intermediate gears $b^6$, (four being herein shown,) secured to or mounted to rotate with a sprocket-wheel $B'$, a suitable cap or casing, as $b^7$, protecting the gears from dust. Obviously rotation of the sprocket-wheel $B'$ will cause simultaneous rotation of the shaft $b$ and sleeve $b^3$, the intermediate gears $b^6$ acting to lock the two parts of the compound axle together; but if one of the propelling-wheels travel faster than its fellow the intermediates $b^6$ will rotate on their axes, permitting such movement in well-known manner. This compensating mechanism in itself is not broadly new. Collars $b^8$, loosely embracing the shaft and sleeve at opposite ends of the hubs of the gears $b^{\times}$ $b^{3\times}$, are rigidly secured to a yoke $b^9$, (see Fig. 9,) to which yoke is attached one end of a distance-rod $b^{10}$, which reaches forward in a preferably nearly horizontal plane, with its front end connected by a suitable ball-and-socket or universal joint at $b^{12}$ with the motor-frame, as will be hereinafter described.

Referring to Fig. 9 and also to Fig. 2, a rigid ear $b^{100}$ on the yoke is embraced by the slotted end $b^{102}$ of a socket-piece $b^{103}$, an upright bolt $b^{104}$ connecting them pivotally. The rod $b^{10}$ is threaded at 37 to enter a threaded hole in the socket-piece $b^{103}$ and is held in locked position by a check-nut 36, it being obvious that relative rotation of the rod and socket-piece will vary the effective length of the rod. Side brace-rods $a^7$, bolted to the under sides of the bearings $a^6$, serve to further stiffen the rear axle and its support, the forward ends of the brace-rods being attached to the side bars $a$.

The band-brake wheel $B^2$ is shown in Fig. 4 as mounted on the sleeve $b^3$ and coöperating with a suitable friction-band 4, operated by a footpiece 5 (see Fig. 2) and intermediate connections 6, the footpiece being in reach of the operator's foot.

The cross-bar $a^3$ is provided with a depending bearing $a^{10}$ and the front bar with a spring-seat $a^{12}$ having a depending bearing $a^{13}$, (see Figs. 2 and 9,) the bearing $a^{13}$ receiving therein a horizontal king-bolt $a^{14}$, in parallelism with the longitudinal central axis of the frame and in alinement with the rear end $a^{15}$ of the front reach $a^{16}$, said rear end $a^{15}$ being supported in the bearing $a^{10}$ to form an auxiliary king-bolt, as it were, the front reach $a^{16}$ being bifurcated at its forward end at $a^{17}$, (see Fig. 9,) and rigidly secured to the spring-seat $a^{12}$. As will be obvious from an inspection of Fig. 9, the main and auxiliary king-bolts are located in the vertical median longitudinal plane of the vehicle, and the bifurcation at $a^{17}$ permits of the passage between the king-bolts of the upright steering-head and the means for controlling the propulsion mechanism.

The front axle is shown as a dropped-down bar or tube $c$, having rigidly secured to its central high point an upturned yoke $c'$, in the arms of which is mounted the king-bolt $a^{14}$, said arms embracing the bearing $a^{13}$, as clearly shown in Fig. 1. The bar $c$ has at its outer ends rigidly-attached vertical outturned yokes $c^2$, Fig. 3, connected by a truss-rod $c^3$ and vertical strut $c^4$, said strut connecting the yoke $c'$ and truss-rod, the whole forming a truss-frame on which the front wheels C C$^{\times}$ are supported, the frame having great strength and rigidity, combined with lightness. A V-brace $c^5$ is mounted at its apex to rock on the front reach $a^{16}$, adjacent the bearing $a^{10}$, the outer ends of the said brace being depressed and rigidly connected at their ends to the truss-frame at or near the vertical yokes $c^2$.

The wheels C C$^{\times}$ are rotatably mounted on short horizontal outwardly-extended spindles $c^6$, adapted to rock on vertical pivots $c^7$ in the yokes $c^2$, each of said spindles having rigidly secured thereto at its fulcrum an inwardly-inclined lever-arm $c^8$, as in Fig. 9, said lever-arms being pivotally connected at their outer ends by a rod $c^9$.

By mounting the front wheels as described they are swung as a whole on their vertical fulcra $c^7$, and by the construction set forth the steering of the vehicle is greatly facilitated, and the power required for turning the wheels is greatly reduced. The lever-arms $c^8$ are set at like angles to the normal running-plane of the front wheels and by the rod $c^9$ will be moved in unison; but from the construction described the wheel at the side toward which the vehicle is to be turned will be deflected more than the opposite wheel, so that both may describe arcs of different circles, and there will be no sidewise scraping of the wheels in turning corners. This is of importance with any form of wheel, as it prevents the side strain thereupon; but it is particularly advantageous in vehicles whereon are used pneumatic-tire wheels, for side scraping would rapidly wear out the material of the tires.

By the described arrangement the steering is made easier, for instead of moving the entire axle only the wheels and their journal-spindles are swung.

The V-brace $c^5$ for the front-axle truss acts to firmly hold the latter against fore-and-aft strains, as when running over an obstruction, and yet by coöperation with the front reach and auxiliary king-bolt $a^{15}$ in no way limits the rocking of the truss on the king-bolts. A collar $d$, having a bore considerably larger than the diameter of the strut $c^4$, surrounds the latter and is partly supported and guided by a nearly-horizontal link $d'$, horizontally pivoted at $d^2$ to one of the yokes $c^2$. The horizontal and vertical pivots 7 and 8, by which the other end of the link $d'$ is connected to the collar, provide not only for a tipping movement of the collar, but also a rotative movement in a substantially-horizontal plane. A second link $d^3$ is jointed at $d^4$ (see Fig. 9) with the connecting-rod $c^9$ between the wheel-controlling lever-arms, the other end of the link being pivoted at $d^5$ to a block $d^6$, fulcrumed on a pin $d^7$ between the upper and lower members 9 and 10 (see Figs. 7 and 9) of an arm rigidly secured to the collar $d$ and extended inwardly toward the rear of the vehicle.

From the foregoing description it will be obvious that the truss-frame $c$ $c^3$ $c^4$ (see Fig. 3) can rock, with its braces $c^5$, about the main and auxiliary king-bolts $a^{14}$ $a^{15}$ (see Fig. 1) and relatively to the frame, providing for inequalities of the road-bed without racking the frame and without preventing the suitable support of the vehicle on four wheels, even if one of the wheels should be elevated or depressed relative to the normal road-surface, this provision being important, as the running of the vehicle is made much smoother and the wear and tear of parts greatly reduced thereby.

A steering head or post $h$, (see Fig. 7,) shown preferably tubular and bent at its upper end to form an overhanging arm $h'$, is rigidly secured at its lower end to the arm 9 10 between the collar $d$ and the block $d^6$, said steering-head passing up in the space between the king-bolts and through a hole $f^\times$ in the bottom of the front end of the carriage-body F, (see Fig. 8,) the hole being larger in diameter than the steering-head and elongated laterally to permit free play of the latter, especially sidewise. The body F is hung at its front end on a transverse spring S of suitable construction secured to the spring-seat $a^{12}$, and at its back the body is supported on side springs S' and $S^2$ by means of suitable straps $s'$ $s^2$, Fig. 3, the springs themselves being secured to seats $s^\times$ on the rear drop-frame $a^2$ $a^4$. (See Fig. 4.) The body is thus yieldingly connected with the main frame or running-gear much as in an ordinary vehicle and having all the advantages of springiness and ease of motion in riding.

Suitable steps $F^\times$ are provided for the convenience of persons in getting into or out of the body, and inasmuch as the latter will be tipped at such time the steering-head $h$ will tip in a vertical plane, the head having at its fulcrum the pivot 7 between the sleeve or collar $d$ and the supporting-link $d'$, Fig. 3; but even with a heavy person the upper end of the steering-head will be swung only a few inches.

The steering-head is supported on the dashboard F' by a bearing (shown separately in section and enlarged in Fig. 7ª) to permit rotative movement, lateral rocking of the head in the bearing, and to prevent longitudinal movement of the head therein, it being remembered that the collar $d$ and arm 9 10, to which the lower end of the head is rigidly secured, are free to move up and down on the strut $c^4$ as the body F rises and falls. The loose collar $d$, with its flexible connections, affords a sufficient pivotal fulcrum for the arm 9 10, as hereinbefore described, and permits the free motion of the steering-head and attached arm as the body of the vehicle moves on its springs. It also serves as a movable guide for the steering-head $h$ and its connections at its lower end for this collar, embracing, but not ordinarily touching, the strut $c^4$, moves up and down as the body of the vehicle rises or falls on its springs without binding or requiring the use of any lubricant.

The arm 9 10 and the collar $d$ are, it will be observed, connected to the lower part of the vehicle by universal joints, which admit of free motion in the connected parts.

In Fig. 7ª the bearing is shown as a sleeve $e$, the bore of which is larger at top and bottom than at the center, in vertical section presenting a curved line $e'$ convex toward the steering-head, which is extended therethrough. The head $h$ may thus be rotated or rocked in a vertical plane in this bearing, no matter what the angular position of the overhanging arm $h'$; but the longitudinal movement of the head is prevented by collars $h^2$ $h^3$, fast thereon above and below the bearing, respectively, and concaved at their inner faces at 12 to ride over the spherical top and bottom $e^2$ $e^3$ of the bearing. Such construction prevents longitudinal and permits rocking movement of the head, the common center of the spherical top and bottom of the bearing and of the concave faces of the collars $h^2$ $h^3$ being indicated at $h^\times$, Fig. 7ª. Obviously were the head $h$ secured to steering-arm 9 10 concentric with its fulcrum a rotative movement of the former would swing the latter and through link $d^3$ and rod $c^9$ turn the steering-wheels; but this is not feasible herein, owing to the fact that the front-axle-truss frame and the strut $c^4$, passing loosely through the collar $d$ at the fulcrum of the steering-arm, occupy the place that the steering-head would occupy were it thus connected with said fulcrum. By rigidly attaching the head to the arm near the latter's fulcrum it is found in practice that the rotation of the head will still swing the arm relative to its fulcrum. Said arm will be tipped or twisted slightly; but the bearing $e$, the elongated hole $f^\times$ in the body F, and the loose collar $d$, as well as the joints 7, 8, and $d^5$, permit this motion. In actual practice, however, I have found that the twist of the arm is so slight that the rocking of the steering-head is hardly perceptible, for the distance between the arm 9 10 and bearing $e$ is about four feet, while the distance from the fulcrum at the collar $d$ to the place where the lower end of the head $h$ is attached to the arm 9 10 is about two and one-half inches, and consequently the overhanging arm $h'$ of the steering-head may be described as swinging practically in a single path from right to left to steer the vehicle.

I have herein shown the rear wheels as the propelling-wheels; but it is evident that my invention is not limited in this respect.

The motor M, mounted on the side of a boiler M' and having a hood or jacket $M^2$ surrounding the cylinders and valve-chests, and the general construction and arrangement of the parts of the boiler and motor may be and are substantially as shown and described in my United States Patent referred to, and while a steam-motor is herein shown for furnishing the propulsion it will be obvious that a gas or other motor may be used without departing from the spirit and scope of my invention.

Referring to Figs. 1, 2, 3, and 7, the throttle is operated by or through a rock-shaft $n$, mounted on the motor and having an arm $n'$, connected by a rod $n^2$ with an arm $n^3$ on a second rock-shaft $n^4$, suitably mounted below the floor $f$ of the vehicle-body. At its forward end, which is carried close to the steering-head $h$, the rock-shaft $n^4$ has a second arm $n^5$, in turn pivotally connected by a link $n^6$ with the arm $n^7$ of a third rock-shaft $n^8$, the link passing through a hole in the floor, as shown in Fig. 7. Clips $h^4$, (see Fig. 5,) secured to the arm $h'$, provide bearings for the rock-shaft $n^8$, which is shown as tubular and held from longitudinal movement in the bearings by collars $y$ $y$, so that the rock-shaft $n^8$ will move with the steering-head as a whole. As best shown in Figs. 5 and 6, a slide-rod $n^9$ enters and is keyed, as at 15, to the hollow rock-shaft $n^8$ to rotate therewith, but having independent longitudinal movement, the outer end of the rod $n^9$ having fast upon it a finger $n^{10}$, extended through a slot $h^5$ in a tubular extension $h^6$ of the steering-arm $h'$, said extension being upturned at its outer end at $h^7$ to form part of a grip or handhold, the latter constituting what may be termed a "hand-controller" for the vehicle. The other part of the grip or hand controller is relatively movable to the part $h^7$, and it is formed as a lever $h^8$, pivoted at $h^9$ on the extension, its foot $h^{10}$ projecting thereinto and embracing the finger $n^{10}$, so that when the operator contracts or squeezes his hand, moving the member $h^8$ against a spring $s^{10}$ relatively to the part $h^7$, the throttle, through the intervening connections, will be opened more or less.

An elbow-lever $o$, fulcrumed on the body F at $o'$, is extended into the slotted part $h^{20}$ of the steering-head, Fig. 7, the other arm of the lever being connected by links $o^2$ $o^4$ and lever $o^3$ with a second elbow-lever $o^5$, (Fig. 2 and drawings in the other application,) which controls the direction of rotation of the main shaft of the motor M, substantially as in my patent referred to. Within the head $h$ a rod $o^6$ connects the elbow-lever $o$ with a chain or flexible connection $o^7$ (see Fig. 7) between the rod and the extension $h^6$, the latter being held from rotation by a key $h^{60}$, Fig. 6.

Obviously by moving the extension $h^6$ longitudinally in the overhanging arm $h'$ by a bodily movement of the controller the direction of movement of the motor, and consequently of the vehicle, may be reversed without the operator for an instant losing control of the steering or speed of the vehicle.

So far as I am aware it is broadly new to steer a vehicle by a steering member movable in a lateral path, to reverse the motor by a movement of the operator's hand toward or from the steering-head, and to control the speed by the contraction or relaxation of the hand at any point in the path of movement of the steering member.

A spring-catch $h^{15}$ is shown in Fig. 5 on the arm $h'$, having one end adapted to enter a socket in the extension $h^6$ to lock and prevent accidental movement of the latter when the vehicle is in use.

The side bars $f^6$ of the body, Figs. 8 and 9, have inwardly-extended braces $f^7$, which are rigidly secured to a suitable support $f^8$, (shown as U-shaped,) and upon which rests the boiler M', together with the engine, which is shown attached to and as a part of the boiler.

I deem it desirable that the motor be supported upon the body in order that it may move with the body and be preserved from jars by the body-springs and also for many other reasons. In the embodiment of my invention herein shown the motor-support is constructed in such a manner as to admit of the motor being moved longitudinally thereon, so that obviously the motor partakes of the body's yielding movements and is also movable fore and aft relatively to the body. Bolts $m^\times$ on the boiler-shell extend freely into slots $f^9$ in the support $f^8$ to hold the boiler and motor in place; but the latter are held from fore-and-aft movement relative to the driven or rear axle fixedly positioned on the frame by the distance-rod $b^{10}$, the ball-and-socket joint $b^{12}$ being rigidly connected by suitable means, as screw-bolts 35, to the motor-frame adjustment of the effective length of the distance-rod, furnishing means for relatively varying or adjusting the distance between the rear or driven axle and the joint $b^{12}$. While I have shown the adjustment as effected by movement of the engine and boiler, yet my invention is not limited to such arrangement. This adjustment acts to tighten or loosen the sprocket or other chain $M^6$, which flexibly connects the sprocket-wheel B' on the rear or driven shaft or axle with a sprocket-wheel $m$ on the main or prime drive-shaft of the motor, and the adjustment is effected, as described, by slackening the lock-nut 36 and by turning the distance-rod $b^{10}$, which has a screw-thread at 37 by which it may be lengthened or shortened. The longer the sprocket-chain $M^6$ the more readily will it flex when the body F is rocked or tipped, and I prefer to place the engine M in front of the boiler, with the sprocket-wheel $m$ as far as possible from the driven sprocket-wheel.

It is obvious from the drawings that the motor and its prime drive member will partake of the varied yielding movements of the body on its springs, tending thereby to approach or recede from the fixedly-positioned driven axle and so interfering with the proper action of the power-transmitting means; but by interposing the distance-rod $b^{10}$ between the driving and driven members and providing for bodily movement of the motor and its prime drive member relatively to the body by the slotted supporting means described the said prime drive member is maintained at a substantially-predetermined distance from the driven axle by the resulting relative fore-and-aft movement of the body and motor. This relative movement is constantly occurring, coincident with the movement of the body on its supporting-springs, and is to be distinguished from the occasional movement of the motor relatively to the body when the effective length of the distance-rod is increased or diminished to adjust the power-transmitting means.

The employment of a steam-motor necessitates provision for protecting the occupants from the heat, and this I effect by twofold means. As shown, the central portion $F'$ of the body is raised to sustain the seat $F^2$, the space beneath accommodating the engine and boiler, and between the bottom of the seat and the boiler I interpose an air-circulating passage $g$, open at its upper rear end at $g'$ and extending below the floor $f$ in a flaring mouth $g^2$ across the body. The air continually rushes into the mouth when the vehicle is running, passing up in front of the engine, over it and the boiler, and out at the exit $g'$, so that a current or broad stream of fresh air is between the occupants of the vehicle and the motive power. In addition to the air-jacket a water-jacket $k$ surrounds the upper part of and extends above the boiler $M'$, said water-jacket being connected by a pipe $k'$, Fig. 1, with the main water-tank K, the shape of the latter in plan being best shown in Fig. 8, branching at the front end to partially embrace the boiler. The tank occupies the greater part of the boot $F^3$ of the body, and water is fed to the boiler through pipe $k^2$ from the jacket $k$ by means of a pump $k^3$, driven by the engine and having a suction $k^×$ from the jacket, the feed-water being thus warmed in the jacket before reaching the boiler, said feed-pipe $k^2$ running up over the jacket and down the other side to the lower end of the boiler, and by the arrangement shown the available space in the vehicle-body is utilized for transporting a large water-supply.

The motor herein shown is run by liquid fuel—such as naphtha, kerosene, &c.—and referring to Figs. 1 and 8 I have shown the fuel-tank as a cylinder P, supported in seats $p$ within the water-tank, lying transversely thereof and more or less completely submerged by the water, according to the quantity of water in the water-tank. An inlet $p'$, (see Fig. 1,) closed in any suitable manner, is accessible from the top of the water-tank K, by which inlet the tank P is filled, while a pipe $p^2$ leads from the latter through the water and out of the water-tank to a fuel-feed regulator $P'$ of any suitable construction, whereby the supply of fuel to the furnace is controlled both automatically and at will by the operator. Owing to the somewhat-inflammable nature of liquid fuel it will be seen that the supply thereof is as far removed as possible from the furnace. It is more or less surrounded by water, and the great body of water is interposed between fuel-tank P and the boiler, so that any possible danger is reduced to a minimum. The liquid-fuel tank may be subjected to pressure from within. In order to best sustain this pressure, this tank is made preferably cylindrical in shape. By inserting this cylinder in the water-tank, which, as shown, occupies practically the whole of the boot, valuable water-space is thereby gained to an extent that would be impossible were the fuel-tank not placed within the water-tank.

In order that the boiler may be filled by hand after blowing off or when starting up the apparatus, I provide a pump $P^3$ (see dotted lines, Fig. 8) beneath the floor $f$ of the body, with a hand-pump plunger $p^3$ at the front, a suction-pipe $p^4$, connecting with the tank K, while the delivery-pipe $p^5$ leads to the boiler either directly or into pipe $k^2$, Fig. 1, the connection therewith in Fig. 1 being omitted to avoid confusion. A nozzle $p^6$, provided with a valve $p^7$, is inserted in the suction $p^4$, and by attaching a hose to the nozzle, opening valve $p^7$, and closing valve $p^8$ water may be pumped from a trough, brook, or other source into the main tank K. When the force-pump $k^3$ is working, the valve $p^8$ is shut, and a valve $p^9$ shuts off the tank from the pump $P^3$ when desired.

I have found in practice that it is difficult with the downturned flue $T'$ to effect a draft and get up steam rapidly from cold water when the fire is first lighted, and to remedy this I provide the hood or cap $M^4$ of the boiler with a short flue $t^3$, Fig. 2, passing up through the water-jacket and air-passage and accessible through a door $f^{30}$, below the seat $F^2$. Normally the flue is closed by a removable plug or damper $t^4$ long enough to close the flue at its inner end; but when firing up the seat-cushion is removed, the door $f^{30}$ opened, and the plug $t^4$ taken out. Preferably a telescopic extension $t^5$ (see dotted lines in Fig. 2) is affixed to the flue, which may be thus lengthened at will to produce a draft, and after the steam is raised the extension is dropped, the plug inserted, and cushion replaced, the downturned flue, with the aid of a steam-jet, then providing ample draft.

My invention is not restricted to the precise construction and arrangement of parts herein described and shown.

Having fully described my invention, what I claim, and desire to secure by Letters Patent, is—

1. In a road-vehicle, propelling mechanism, speed-controlling means therefor, a steering-head having a rotative movement to steer the vehicle, and a compressible handhold mounted on the steering-head connected with the speed-controlling means, to regulate the latter by variation of hand-pressure on said handhold, substantially as described.

2. In a road-vehicle, propelling mechanism, speed-controlling means therefor, a steering-head having an overhanging arm adapted to travel in a lateral path to steer the vehicle, and a compressible handhold on said arm, having a connection with the speed-controlling means, whereby variation in hand-pressure on the handhold will regulate the speed, substantially as described.

3. In a road-vehicle, propelling mechanism, speed-controlling means therefor, a steering-head having an overhanging arm adapted to be swung in a lateral path to steer the vehicle, a handhold on said arm having a movable member, and a shaft supported on the arm and rocked by movement of said member, the latter having a connection with and to actuate the speed-controlling means by variation of hand-pressure by the operator, substantially as described.

4. In a road-vehicle, propelling mechanism, reversing and speed-controlling means therefor, and a steering-head having an extension-arm movable in a lateral path and provided with a compressible handhold, combined with connections between said arm and handhold and the propelling mechanism to operate the latter by longitudinal movement of the arm and compression of the handhold, substantially as described.

5. In a road-vehicle, propelling mechanism, reversing means therefor, a steering-head having an overhanging extensible arm movable laterally to steer the vehicle, and a connection between the extension-arm and said reversing means, to operate the latter by longitudinal movement of the former, substantially as described.

6. In a road-vehicle, steering mechanism, propelling mechanism and speed-governing means therefor, and a compressible speed-controlling member connected with and to control both the said steering mechanism and speed-controlling means, substantially as described.

7. In a road-vehicle, steering mechanism, propelling mechanism and speed-governing means therefor, and a compressible speed-controlling member connected and moving with the steering member, to control the speed of the vehicle, substantially as described.

8. In a road-vehicle, propelling mechanism, reversing mechanism, steering mechanism and a single compressible hand-controller connected with and to control said propelling, reversing and steering mechanism, one of said mechanisms being controlled by the compression of said controller, substantially as described.

9. In a road-vehicle, propelling mechanism, reversing mechanism, steering mechanism and a single longitudinally-moving compressible hand-controller connected with and to control said propelling, reversing and steering mechanism, one of said mechanisms being controlled by the longitudinal movement of said compressible hand-controller, substantially as described.

10. In a road-vehicle, propelling mechanism, reversing means therefor, a steering-head having an overhanging extensible arm movable laterally to steer the vehicle, a two-part telescopic rock-shaft mounted on said arm and a compressible handhold on the latter, connected with and to rock the shaft when desired, and a connection between the extension-arm and said reversing means, to operate the latter by longitudinal movement of the former, combined with speed-controlling means connected with and operated by partial rotation of said rock-shaft, due to variation of pressure on the handhold, substantially as described.

11. In a road-vehicle, propelling mechanism, reversing means therefor, a steering-head having an overhanging extensible arm movable laterally to steer the vehicle, a locking device to prevent accidental longitudinal movement of the extensible part of the arm, and connections between the extensible part of the arm and reversing means, to operate the latter by longitudinal movement of the former, substantially as described.

12. In a road-vehicle, a steering-axle, wheel-spindles pivoted to the ends thereof, and an arm set at an angle on each wheel-spindle, and a connection between the extremities of said arms, combined with a rotatable steering-head having a rigidly-attached arm at its lower end, a link connecting said arm and the connection between the spindle-arms, a fulcrum supported on the steering-axle for said rigidly-attached arm, and a supporting-bearing on the vehicle-body, in which said head is suspended and permitted to rock, substantially as described.

13. In a road-vehicle, a main frame, a body connected therewith by springs, a steering-axle, wheel-spindles pivoted to the ends thereof, and a horizontal pivot connection between the axle and frame, combined with a rotatable steering-head suspended from and adapted to rock in a bearing on the vehicle-body, an arm rigidly secured to the lower end of the head, and connections between said arm and wheel-spindles, to rock the latter on their fulcra and steer the vehicle, substantially as described.

14. In a motor-vehicle, variable-speed propelling mechanism, steering mechanism including a steering-head having a rotating movement to steer the vehicle, and a multipart hand-controller the parts of which are movable relatively to each other, the controller being mounted on the steering-head and by bodily movement rotating the latter, a member of the controller being operatively connected with the propelling mechanism to control the same by relative movement of said member by the hand of the operator while the controller as a whole is also manipulated by the hand.

15. In a road-vehicle, a main frame, a truss-frame axle horizontally pivoted to said main frame, a vertical strut at or near the center of the truss-frame axle, and a steering-arm loosely embracing at one end said strut, combined with steering-wheels connected to the said arm, a rotative steering-head rigidly secured at its lower end to the arm near the strut, the vehicle-body yieldingly connected with the main frame, and a bearing on said body for the upper end of the steering-head, from which bearing said head is suspended, substantially as described.

16. In a road-vehicle, a main frame, a body connected therewith with springs, an axle, a steering-head connected with said body to move therewith as the body moves on its springs, an arm rigidly secured to said steering-head at its lower end, said arm being fulcrumed on said axle and connected therewith by a universal joint, substantially as described.

17. In a road-vehicle, a main frame, a body connected therewith by springs, a steering-head having a rigidly-attached arm at its lower end, said steering-head and arm being connected with said body to move therewith as the body moves on its springs, a fulcrum for said arm, a truss-frame axle and vertical strut, such fulcrum loosely embracing such vertical strut and connected with the main frame by a universal joint, substantially as described.

18. In a road-vehicle, a main frame, a body yieldingly connected therewith with springs, a steering-head suspended on said body to move therewith as the body moves on its springs, an arm rigidly secured to said steering-head at its lower end, an axle having wheel-spindles at its ends, and each having an arm set at an angle from said spindle, said spindle-arms connected by a cross-rod at their ends, a fulcrum for said steering-head arm at one end thereof, and connected to said axle by a universal joint, substantially as described.

19. In a road-vehicle, a main frame, a truss-frame axle horizontally pivoted on said main frame and provided with a central, vertical strut, a body yieldingly connected with said frame, a rotatable steering-head and a suspension-bearing therefor on the vehicle-body, said head being adapted to rock in said bearing, combined with an arm rigidly secured to the lower end of the steering-head and fulcrumed on a collar loosely embracing said strut, and means operated by rotative movement of the steering-head, to steer the vehicle, substantially as described.

20. In a road-vehicle, a main frame, an axle having wheel-spindles fulcrumed at its ends, independent main and auxiliary horizontal king-bolts connected to said axle and supported by main-frame bearings in substantial alinement, braces reaching from the auxiliary king-bolt to or near to the ends of the axle, and means, including an upright steering-head independent of and extended between the inner, separated ends of the king-bolts, to swing the wheel-spindles to steer the vehicles, substantially as described.

21. A motor-vehicle containing a pair of propelling-wheels, a pair of steering-wheels, a body yieldingly sustained on said wheels through the medium of a plurality of longitudinal substantially-horizontal fulcra arranged one in front of and separated from the other and about which said steering-wheels may rock, a motor mounted on said body and operatively connected with said propelling-wheels, and combined steering and speed controlling devices operatively connected respectively with said steering-wheels and with said motor and working directly between said fulcra.

22. In a motor-vehicle, the combination of a body, a shaft carrying a propelling wheel or wheels and also carrying a gear-wheel, a crank or other drive-shaft provided with a gear-wheel, a belt connecting the gear-wheels on the said shafts, a motor connected with and adapted to rotate the drive-shaft and movably connected with the body, whereby it is adapted to be adjusted on the body and with respect to the shaft carrying the propelling wheel, or wheels, and a longitudinally-adjustable rod connecting the two shafts, substantially as specified.

23. In a motor-vehicle, the combination of a main frame, a body mounted on springs on the main frame, a shaft journaled in the main frame and carrying a propelling wheel or wheels, a motor carried by and movably connected with the body, a crank or other drive-shaft connected with and carried by the motor, gearing intermediate of the two shafts, and a longitudinally-adjustable rod pivotally connected with the shaft carrying the propelling wheel or wheels and connected in a swiveled manner with the drive-shaft of the motor, substantially as specified.

24. In a road-vehicle, a frame, a driven axle mounted in bearings thereon, a body yieldingly connected with the frame, a motor mounted to partake of the body's yielding movements, and also movable fore and aft relatively to the body, direct driving connections between the motor and axle, to drive the latter, and means to maintain a substantially-predetermined distance between the motor and driven axle in the path of power transmission.

25. In a road-vehicle, a frame, a driven axle mounted in bearings thereon, propelling-wheels operatively connected with the axle, steering-wheels connected with the frame, the side bars of the latter maintaining a fixed distance between the said axle and the steering-wheel connections, a body yieldingly connected with the frame, a motor mounted to partake of the body's yielding movements, and also movable fore and aft relatively to the body, direct driving connections between the motor and axle, to drive the latter, means to maintain a substantially-predetermined distance between the motor and driven axle in the path of power transmission, and means to control the steering-wheels to guide the vehicle.

26. In a road-vehicle, a frame, a driven axle mounted in bearings thereon, combined with a body yieldingly connected with said frame, a motor carried by said body and adjustable fore and aft thereon to vary the distance between it and said driven axle, and driving connections between said motor and axle for driving the latter by the former, substantially as described.

27. In a road-vehicle, a driven axle having attached wheels, a main frame mounted on said axle, a body yieldingly connected with the main frame, a motor with its weight supported solely on said body, a longitudinally-adjustable distance-rod, connecting said driven axle and motor, an endless, flexible power-transmitting connection between said motor and axle, to rotate the latter, adjustment of the distance-rod moving the motor relatively to the body and serving to take up and adjust the flexible power-transmitting connection, substantially as described.

28. In a road-vehicle, a driven axle having attached wheels, a main frame mounted thereon, a body yieldingly connected with the main frame, a motor whose weight is supported on said body, a longitudinally-rigid adjustable distance-rod connecting said driven axle and motor, and having a universal joint between said driven axle and motor, an endless flexible, power-transmitting connection between said motor and axle to rotate the latter, adjustment of the distance-rod moving the motor relatively to the body and serving to take up and adjust the flexible connection, substantially as described.

29. In a road-vehicle, a main frame having bearings, and a driven axle mounted therein and having a sprocket-wheel, combined with a body yieldingly connected with the frame, a support on the body, a motor mounted on said support and movable fore and aft thereon, a driving-chain from the motor to the axle sprocket-wheel, and an adjustable distance-rod connected at one end to the axle and at the other end to the motor, adjustment of the distance-rod moving the motor on its support and adjusting the chain, substantially as described.

30. In a road-vehicle, a main frame, fixed bearings thereon, a driven axle mounted in said bearings, a body, springs connecting it with the main frame, and a motor mounted to partake of the body's yielding movements, and also movable fore and aft relatively thereto, combined with a distance-rod between the motor and driven axle to position the former, and maintain a substantially-predetermined distance between said motor and axle, and a universal joint connecting the motor and the distance-rod, whereby the body may move freely on its supporting-springs, substantially as described.

31. In a motor-vehicle, propelling-wheels, a driven shaft connected with and to rotate said wheels, a yieldingly-sustained prime drive-shaft connected with and to rotate said driven shaft, and a distance-rod acting about a fixed fulcrum at or adjacent said driven shaft, to maintain a substantially-predetermined distance between said shafts.

32. In a motor-vehicle, a pair of propelling-wheels, a non-yieldingly-supported and fixedly-positioned driven shaft operatively connecting them, a yieldingly-supported body, a motor and its prime drive-shaft mounted to partake of the body's yielding movements, endless flexible power-transmitting means between said drive-shaft and driven shaft, and a distance-rod acting to control bodily movement of said drive-shaft and maintain a substantially-predetermined distance between said shafts while permitting the movement of said drive-shaft due to the body's yielding movements.

33. In a motor-vehicle, one or more propelling-wheels, a yieldingly-sustained prime drive-shaft connected with and to rotate said wheel or wheels, and longitudinally-adjustable means acting about a fixed fulcrum at or adjacent the axis of said wheel or wheels to maintain a substantially-predetermined distance between said prime drive-shaft and the axis of said wheel or wheels in the path of power transmission.

34. In a motor-vehicle, propelling-wheels, a driven shaft connected with and to rotate said wheels, a yieldingly-sustained prime drive-shaft connected with and to rotate said driven shaft, and universally-jointed means acting about a fixed fulcrum at or adjacent said driven shaft to maintain a substantially-predetermined distance between said shafts in the path of power transmission.

35. In a motor-vehicle, running-gear including fixedly-positioned propelling-wheels, springs, and a body thereon sustained on said running-gear, a motor and its prime drive-shaft mounted to partake of the body's yielding movement and operatively connected with said propelling-wheels, a distance member acting about a fixed fulcrum at or adjacent the axis of said propelling-wheels to maintain a substantially-predetermined distance between said prime drive-shaft and the axis of said wheels in the path of power transmission, and means to prevent torsional strain of said distance member when the body tips on its supporting-springs.

36. In a motor-vehicle, a pair of propelling-wheels, a fixedly-positioned driven shaft operatively connecting them, a spring-supported body, a motor and its prime drive-shaft, symmetrically located relative to said wheels and mounted to partake of the body's yielding movements, a power-transmitting connection between said shafts, and a distance-rod held at one end midway between the propelling-wheels and at its other end having a connection with the prime drive-shaft, to maintain the latter at a proper working distance from the driven shaft while permitting freedom of movement of the body on its springs.

37. A motor-vehicle provided with propelling-wheels, yieldingly-sustained propulsion means, power-transmitting connections between said propulsion means and said wheels, and a distance member between said means and said wheels and bifurcated at its ends to span said power-transmitting connections thereat.

38. In a motor-vehicle, a pair of propelling-wheels, a fixedly-positioned driven shaft operatively connecting them, a spring-supported body, a motor and its prime drive-shaft, symmetrically located relative to said wheels and mounted to partake of the body's yielding movements, power-transmitting connections between said shafts acting upon the driven shaft midway between the propelling-wheels, and distance means connected with the driven shaft at each side of the said power-transmitting connections, and correspondingly connected with the prime drive-shaft, to maintain the latter at a proper working distance from the driven shaft while permitting freedom of movement of the body on its springs.

39. In a motor-vehicle, propelling-wheels and a rotatable driven shaft connecting and to rotate them, compensating mechanism mounted on said shaft, a motor and its prime drive-shaft, power-transmitting means between said prime drive-shaft and the compensating mechanism, and a distance-rod interposed between the said shafts, and bifurcated to straddle said transmitting means at one end of said distance-rod and to straddle the compensating mechanism at the other end thereof.

40. In a road-vehicle provided with one or more propelling-wheels, a driven shaft connected therewith and having a sprocket-wheel, a motor provided with a prime drive-shaft, a sprocket-chain connecting said drive-shaft, and sprocket-wheel to rotate the driven shaft, a yoke loosely mounted on the latter shaft and straddling the sprocket-wheel, a distance-rod pivotally connected with said yoke to swing laterally relatively thereto, and a ball-and-socket joint connecting said rod and the motor and prime drive-shaft, whereby the latter shaft and motor are always maintained at a proper operative distance from the driven shaft whatever be the other movements of the one relative to the other.

41. In a motor-vehicle, propelling-wheels, a driven shaft connected with and to rotate them, a spring-supported body, a vertically-acting motor mounted to partake of the body's yielding movements and also movable fore and aft relatively to the body, power-transmitting means between said motor and driven shaft, and distance means acting about a fixed fulcrum at or adjacent said driven shaft to maintain a substantially-predetermined distance between a given part of said motor and said driven shaft while permitting the otherwise free yielding bodily movement of said motor with the body, said motor, power-transmitting means, and the distance means being arranged and acting symmetrically relatively to the longitudinal vertical median plane of the vehicle, to prevent the operation of said motor from causing oscillations of the spring-supported portions of the vehicle.

42. In a motor-vehicle, a frame, a fixedly-positioned axle thereon, propelling-wheels rigidly secured to the axle, a driven gear fast on the axle, a yieldingly-sustained body, a motor and its prime drive-gear mounted to partake of the body's yielding movements, endless flexible power-transmitting means directly between said drive and driven gears, said gears and the transmitting means being all located along the longitudinal center of the vehicle, and a distance member also arranged along such longitudinal center to maintain said drive and driven gears at a substantially-predetermined distance one from the other while permitting free yielding movements of the body.

43. In a motor-vehicle, running-gear, including propelling-wheels, a driven shaft connected with and to rotate said propelling-wheels, a spring-supported body having a seat, a steam-generator supported on said body under the seat, a vertically-acting reciprocating engine in front of said generator, and a substantially-horizontal, direct power-transmitting connection operating below said generator and between the engine and the driven shaft.

44. A motor-vehicle having a frame, fixedly-positioned propelling-wheels supporting opposite sides of the frame at one end thereof, steering-wheels supporting the other end of said frame, a longitudinal, substantially-horizontal pivot connection between the steering-wheels and frame, the several wheels acting to support said frame at three points in a plane substantially parallel with the plane of the axis of the propelling-wheels, a motor and its prime drive-shaft yieldingly sustained within said three points of support, direct operating connections between said drive-shaft and propelling-wheels, and means operating about a fixed fulcrum at or adjacent the axis of the propelling-wheels to maintain a substantially-predetermined distance between such axis and said drive-shaft adjacent the operating connections while permitting the yielding bodily movement of said drive-shaft relatively to the propelling-wheels.

45. In a motor-vehicle, a pair of steering-wheels, a pair of propelling-wheels, a driven shaft in actuating engagement with the propelling-wheels, a yieldingly-supported body having a seat, a steam-generator supported by the body and substantially concealed within it and under the seat, a substantially vertical-acting steam-engine, including a prime drive-shaft, supported by said body in front of the generator, said engine being substantially concealed within the body and under the seat, direct, substantially-horizontal power-transmitting means passing under said generator and transmitting the power from the prime drive-shaft to said driven shaft, and means to maintain a predetermined distance between said shafts in the path of power transmission, while permitting the otherwise free yielding bodily movement of said drive-shaft relative to said driven shaft.

46. In a road-vehicle, propelling-wheels, a yieldingly-sustained body, a steam-generator and connected motor having a drive-shaft, all mounted to partake of the body's yielding movements and also movable fore and aft relatively to the body, driving connections between the said shaft and the propelling-wheels, to actuate the latter, and means to maintain said generator, motor and its drive-shaft at a substantially-predetermined distance from the axis of rotation of said wheels.

In testimony whereof I have signed my name to this specification in the presence of two subscribing witnesses.

GEORGE E. WHITNEY.

Witnesses:
GEORGE B. UPHAM,
FREDERICK L. EMERY.